July 9, 1946.          E. KATZBERG          2,403,802
REVERSIBLE OPERATING MECHANISM
Filed Dec. 29, 1944          2 Sheets-Sheet 2
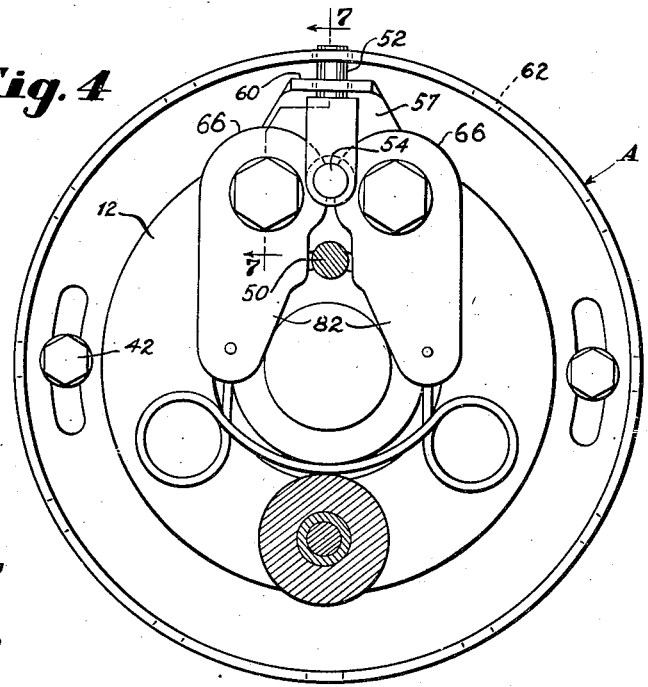
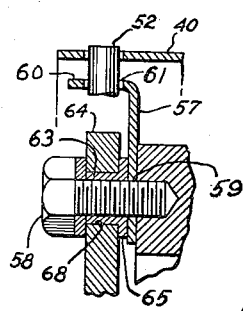
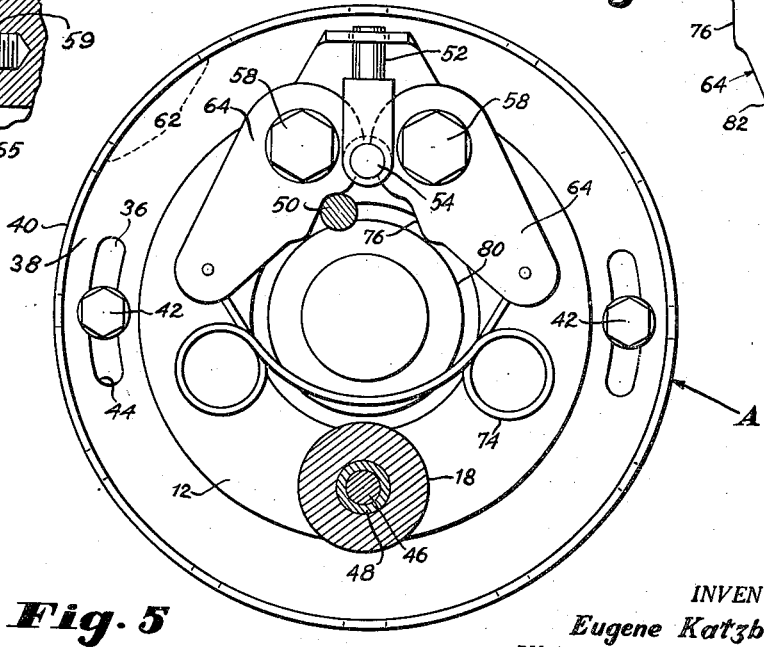
INVENTOR.
Eugene Katzberg
BY
M. B. Tasker
ATTORNEY Patented July 9, 1946

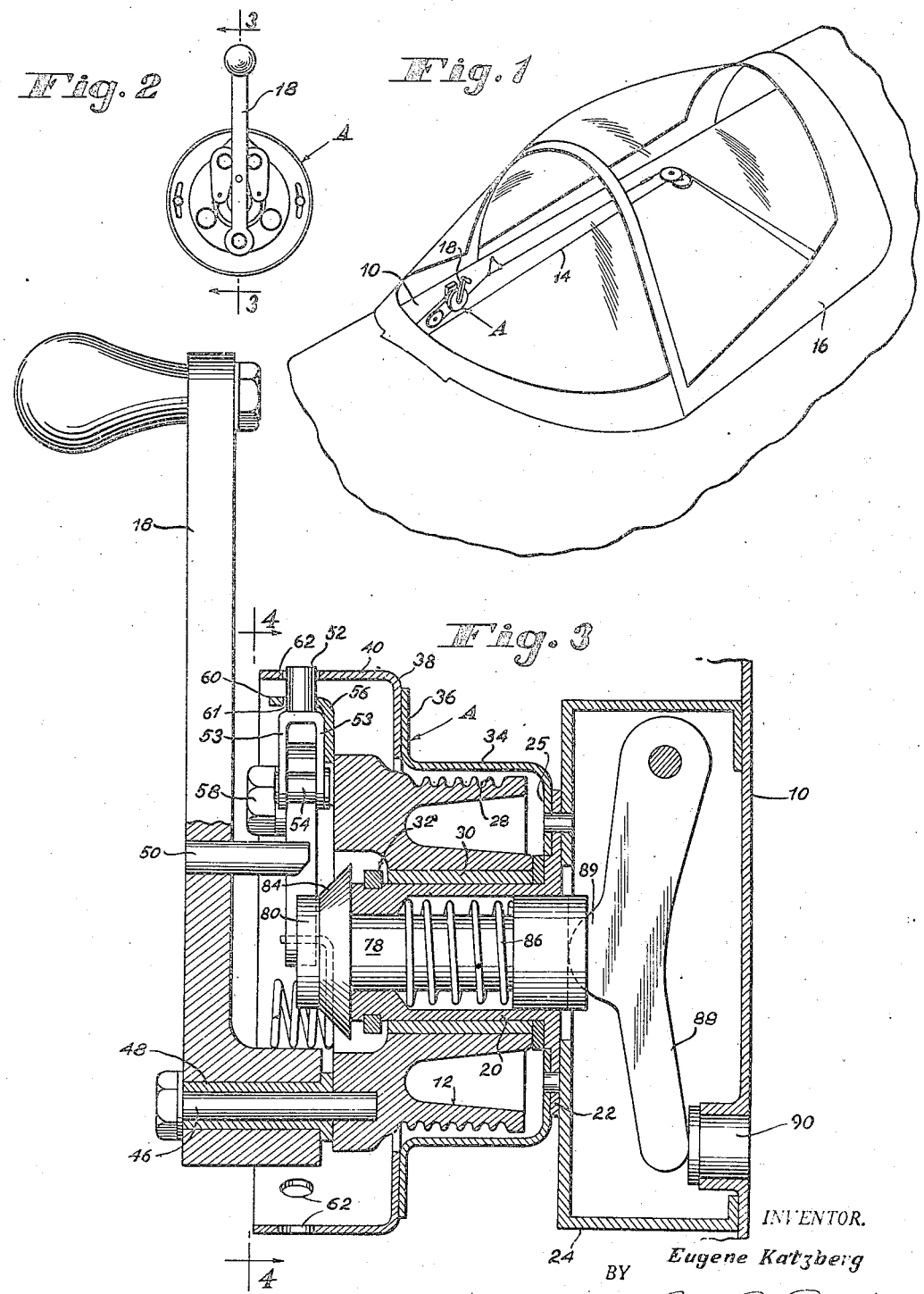

2,403,802

UNITED STATES PATENT OFFICE 2,403,802

REVERSIBLE OPERATING MECHANISM

Eugene Katzberg, Bridgeport, Conn., assignor to United Aircraft Corporation, East Hartford, Conn., a corporation of Delaware Application December 29, 1944, Serial No. 570,362

12 Claims. (Cl. 192—8)

This invention relates to operating and locking mechanism which is especially adapted, although not limited, to use in connection with the manual adjustment of a closure member.

An object of the invention is to provide an improved operating and locking mechanism having an actuating member which is unlocked by manual movement in either direction and which is automatically locked in any of its adjusted positions following operation.

A further object of the invention is to provide mechanism of this general type having an actuating member which is operable by one hand of the operator and which includes improved cam operated means for unlocking the mechanism upon initial movement of the actuating member by the operator and for locking the mechanism upon release of the actuating member.

A further object is generally to improve the construction and operation of hand actuated operating and locking mechanisms.

Other objects and advantages of the invention will be apparent from the following detailed description of one desirable embodiment thereof shown in the accompanying drawings which are submitted for purposes of illustration.

In the drawings,

Fig. 1 is a perspective view of a pilot's cabin showing the operating and locking mechanism of the invention used to adjust a slidable cabin top.

Fig. 2 is a front view on an enlarged scale of the operating and locking mechanism shown in Fig. 1.

Fig. 3 is a vertical section of line 3—3 of the Fig. 2 on a very much enlarged scale.

Fig. 4 is a section on line 4—4 of Fig. 3 showing the mechanism in locked position.

Fig. 5 is a view similar to Fig. 4 with the mechanism in unlocked position.

Fig. 6 is a detail of a lock operating cam, and

Fig. 7 is a section on line 7—7 of Fig. 4 showing the support for the lock plunger guiding bracket and also showing the pivotal support for a plunger operating cam.

As herein shown, the improved operating and locking mechanism generally indicated at A is mounted on the side wall 10 of the pilot's cabin in a position convenient to the pilot and includes an operating member in the form of a cable drum 12 around which is wrapped operating cable 14 connected to a horizontally slidable cabin top 16 for moving the latter in either the fore or aft direction by a manual actuating handle, or crank, 18.

As shown most clearly in Fig. 3, a supporting member 20 has a flange 22 which is secured in any suitable manner to a shallow housing 24 mounted on the cabin side wall 10. The supporting member 20, which is generally tubular, extends horizontally from the housing 24 and provides a journal for drum 12 herein provided with external grooves 28 to receive several turns of the closure operating cable 14. A suitable wear resisting bushing 30 is provided for the drum and a retaining ring 32 is provided on the supporting member for preventing axial displacement of the drum thereon. A fixed annular housing 34 has an inwardly directed radial flange 25 which is secured to flange 22 of the supporting member and this housing terminates in an outwardly directed radial flange 36. The flange 36 is sufficiently wide to provide a bearing for the parallel flange 38 of an enlarged annular housing 40 which is concentric with the drum 12. The flange 38 is adjustably secured to flange 36 by means of a pair of diametrically opposed cap screws 42 (Fig. 5) screw-threaded into flange 36 and passing through elongated arcuate slots 44 in flange 38 which are struck about the axis of the supporting member 20 and thus permit the housing 40 to be adjusted angularly relative to housing 34 within the limits of angular rotation permitted by the slots.

The crank 18 is pivotally secured to the front face of drum 12 at the periphery thereof by a cap screw 46 which extends through a flanged bushing 48 providing a bearing for the lower end of the handle. At the diametrically opposite position on the periphery of drum 12 the handle 18 carries a rigid pin 50 which projects toward the front face of the drum and extends into the front housing 40. This pin constitutes the actuating means for the drum locking and unlocking mechanism which will next be described.

The locking mechanism includes a radially reciprocable detent, or plunger, 52 having bifurcations 53 at its inner end in which a roller 54 is journalled. The plunger is guided in its radial movements by a bracket member 56 the vertical portion 57 of which is rigidly secured to the front face of the drum 12 diametrically opposite pivot 46 by two cap screws which extend through holes 59 in bracket portion 57 on opposite sides of plunger 52 (Fig. 7). The bracket 56 has a forwardly directed flange 60 provided with a guiding aperture 61 for the plunger 52 which cooperates with a plurality of peripherally spaced plunger receiving apertures 62 in housing 40. It will thus be evident that the housing 40 constitutes an adjustable keeper for cooperation with the locking plunger 52, the apertures 62 being located in the plane of rotation of the plunger and cooperating with the latter to lock the drum in any of a plurality of angularly adjusted positions.

The plunger 52 is controlled by a pair of cam members 64 one of which is shown in Fig. 6. These cam members are identical but are oppositely disposed so that like cam portions thereof are disposed in confronting relation. Each cam member 64 has an upper annular portion 66 which is struck about the center of the pivotal aperture 68 thereof through which the supporting cap screw 58 extends. As shown most clearly in Fig. 7, each cam member 64 is journalled on a bushing 63 provided with a spacing flange 65 which overlies the bracket portion 57 and locates the planes of the cam member between the furcations 53 at the lower end of locking plunger 52. The studs 58 which provide the pivots for the two cam members extend through bushings 63 and are laterally spaced so that the annular portions 66 of the two cam members 64 extend between furcations 53 and meet on the longitudinal center line of the locking pin 52. The cam members 64 have semi-circular confronting recess 70 formed in the annular surfaces 66 to receive the roller 54 of the locking plunger. These recesses are located sufficiently close to a center line drawn through the axes of cap screws 58 to trap the roller 54 between the cam members during movement of the latter between their extreme positions as shown in Figs. 4 and 5.

It will thus be evident that the roller 54 interlocks the two cam members so that they are constrained to move in unison in opposite directions, and conversely the movement of either cam member will cause a corresponding movement of the other cam member and radial movement of the plunger. The free end, or tail, of each of the cam members is provided with a small aperture 72 to receive the bent end of a spring 74 which is designed to constantly urge the tails of the cam members inwardly toward the axis of rotation of the drum. The spring 74 is sufficiently strong to cause the cam members 64 to move the handle into its normal centered position shown in Fig. 2 by engaging pin 50. The pin lies between normally vertical portions 76 on cam members 64 merging with the circular portions 66 of the cam members to form abutments for the pin 50 at the junction of these surfaces 76 which limit the pivotal movements of the cam members under the action of the handle 18.

Means are provided for moving the cam members 64 independently of the handle 18 from a position outside the cabin. To this end a plunger 78 is mounted in the axial passage in supporting member 20 having an enlarged annular forward end 80 which lies between the confronting tail surfaces 82 of the cam members 64. This surface 80 constitutes stop means for limiting the movement of the plunger 52 under the action of spring 74. The plunger 78 is also provided with a conical surface 84 which is contiguous with the surface 80 and which, upon movement of plunger 78 in a forward direction, cams the members 64 apart to withdraw the locking plunger 52. The plunger 78 is normally biased by a spring 86 into the position shown in Fig. 3 in which the surface 80 lies in the plane of the cam members 64. A pivoted lever 88 disposed in housing 24 has an abutment 89 which constantly engages the slotted rear end of plunger 78 and moves the plunger forwardly upon inward movement of a button 90 the outer end of which is flush with the outer surface of the cabin side wall 10, as shown in Fig. 3.

It will be evident that normally the handle 18 occupies the mid-position shown in Figs. 2, 3 and 4 in which the tails of cam members 64 are generally parallel and the locking plunger 52 is in an aperture 62 of the keeper. If it is desired to move the cabin top closure 16, the pilot moves the handle 18 in the desired direction of rotation. Assuming that the handle is moved counterclockwise as viewed in Fig. 2, the initial movement of the handle causes the pin 50 thereon to engage the left-hand cam member 64 and move the same in a clockwise direction about its pivot 58 into the position shown in Fig. 5. During this movement the roller 54 in recess 70 will be moved downward to withdraw the plunger 52 from the keeper, the right hand cam member 64 also being forced to rotate counterclockwise by roller 54. Further movement of the handle will cause counterclockwise rotation of the drum to move the closure member. It will be noted that the initial lost motion movement of the operating handle relative to the drum during which motion the plunger 52 is withdrawn, occurs before there is any positive force exerted on the drum to rotate the same. With the parts in the unlocked position shown in Fig. 5, the drum can be freely rotated in a counterclockwise direction by the handle 18 to move the closure member into the desired position. When the handle 18 is released by the operator the spring 74 acting on the tails of cam 64 causes the handle to be moved to its normal central position and also automatically moves the plunger 52 into position to enter an aperture 62 in the keeper. In the event that the plunger does not register with an aperture 62, it will be evident that a slight movement of the drum will bring the plunger into register with an adjacent aperture into which the plunger will automatically enter under the bias of spring 74.

Due to the interlock provided between the two cams 64 by the roller 54, movement of the handle 18 in the clockwise direction in Fig. 2 will result in a similar operation of the mechanism.

Closure member 16 can be moved free from the handle 18 by a person outside the cabin by depressing the button 90 to unlock the mechanism by the action of the conical face 84 of plunger 78 on the tails of cams 64 as has been previously described.

As a result of this invention, it will be evident that an operating and locking mechanism has been provided which is manually operable by one hand of the pilot to move a closure member in either direction and which is automatically locked in any of its adjustable positions upon the release of the handle by the operator. It will further be evident that an improved cam actuated mechanism has been provided for locking and unlocking such a mechanism automatically in response to movement of the handle which is extremely simple in construction and reliable in operation.

It will also be noted that the locking mechanism of the invention can be easily adjusted to bring a keeper aperture into register with the locking plunger in any particular position of the closure member, as for example, the closed position thereof.

While the improved operating and locking mechanism of the invention has been described in connection with a particular closure member for pilots' cabins, it will be evident that numerous changes in the construction and arrangement of the parts may be made and the mechanism may be associated with widely different closure members without departing from the scope of the following claims.

I claim:

1. In an operating and locking mechanism, a support, an operating member mounted for movement on said support, a locking detent carried by said operating member, a cooperating keeper carried by said support, and actuating means for said operating member including an actuating member having a lost motion connection with said operating member and a pair of cam members supported on said operating member on pivots located on opposite sides of said actuating member and movable about their pivots by opposite movements of said actuating member, said cam members having cam surfaces cooperating with said detent for moving the latter into and out of locking engagement with said keeper upon movement of said actuating member relative to said operating member.

2. In an operating and locking mechanism, a support, an operating member rotatably mounted on said support, an actuating member for said operating member, cooperating locking means carried by said operating member and support for securing the former in a plurality of angular positions of rotation thereof including a reciprocable plunger, and means for automatically withdrawing said plunger from locking position upon movement of said actuating member including a pair of pivoted cam members having opposed arcuate portions concentric with their pivots and having confronting complemental recesses in said arcuate portions, and cam interlocking means carried by said plunger and disposed in said recesses.

3. In an operating and locking mechanism, a support, an operating member mounted on said support for movement in opposite directions, an actuating member for said operating member having a lost motion connection therewith, a locking plunger carried by said operating member, a cooperating keeper carried by said support, a pair of pivoted cam members alternately engageable by a portion of said actuating member upon movement of the latter in opposite directions, and means carried by said plunger for interlocking said cam members with each other and with said plunger for effecting movement of said plunger out of locking engagement with said keeper upon movement of either cam member by said actuating member.

4. In an operating and locking mechanism, a support, an operating drum mounted for rotation on said support, an actuating handle for said drum having a lost motion connection therewith, a radially reciprocable locking plunger carried by said drum, a cooperating keeper carried by said support including an annular housing enclosing said plunger and having a plurality of plunger receiving apertures at spaced points about its periphery, a pair of pivoted cam members carried by said drum having confronting recesses therein, a plunger actuating member carried by the lower end of said plunger and disposed in said recesses, and means carried by said handle in position to engage one or the other of said cam members upon movement of said handle in opposite directions for withdrawing said plunger from said keeper as said handle moves relative to said drum.

5. In an operating and locking mechanism, a support, an operating drum mounted for rotation on said support, an actuating handle carried by said drum having a lost motion operating connection therewith, a radially reciprocable locking plunger carried by said drum, a cooperating keeper carried by said support including an annular housing enclosing said plunger and having a plurality of plunger receiving apertures at spaced points about its periphery, a pair of pivoted cam members carried by said drum having confronting recesses therein, a plunger actuating member carried by the lower end of said plunger and disposed in said recesses, and means carried by said handle in position to engage one or the other of said cam members upon movement of said handle in opposite directions for withdrawing said plunger from said keeper as said handle moves relative to said drum, and means for adjusting said annular housing on said support for varying the positions of said drum in which registry of said plunger and said apertures occurs.

6. In an operating and locking mechanism, a support, a drum mounted for rotation on said support, a diametrically disposed actuating member having a pivotal connection with the periphery of said drum at one end, a locking plunger carried by said drum adjacent the other end of said handle, an annular keeper carried by said support having a plurality of peripherally spaced apertures located in the plane of rotation of said plunger, a pair of cam members pivoted to said drum on opposite sides of said handle, said cam members having arcuate upper portions concentric with their pivots and having confronting recesses in said arcuate portions, an interlocking member carried by the lower end of said plunger and disposed in said recesses for interlocking said cams and said plunger for simultaneous movement, and means carried by said handle and disposed between the tails of said cams for actuating the latter to reciprocate said plunger and unlock said mechanism upon movement of the handle in either direction.

7. In an operating and locking mechanism, a support, a drum mounted for rotation on said support, a diametrically disposed actuating member having a pivotal connection at one end with the periphery of said drum, a locking plunger carried by said drum adjacent the other end of said handle, an annular keeper carried by said support having a plurality of peripherally spaced apertures located in the plane of rotation of said plunger, a pair of cam members pivoted to said drum on opposite sides of said handle, said cams having arcuate upper portions concentric with their pivots and having confronting recesses in said arcuate portions, an interlocking member carried by the lower end of said plunger and disposed in said recesses for interlocking said cams and said plunger for simultaneous movement, means carried by said handle and disposed between the tails of said cams for actuating the latter to unlock said mechanism upon movement of the handle in either direction, and spring means continually biasing said cam members in directions to move said plunger into locking position.

8. An operating and locking mechanism, a support, an operating drum mounted for rotation on said support, an actuating handle disposed substantially diametrically across a face of said drum and having one end thereof pivoted to the periphery of said drum, a radially reciprocable locking plunger carried by said drum, a cooperating keeper carried by said support including an annular member having a plurality of plunger receiving apertures therein, and cam actuating means for said plunger including a pair of generally parallel cam members disposed on opposite sides of said handle and pivoted to the periphery of said drum adjacent their outer ends, said cam members also having upper arcuate extremities concentric with their pivots which meet substantially in the radial center line of said plunger, an interlocking member carried by the inner end of said plunger and received in said recesses for interlocking said cam members and plunger, said cam members also having tail portions which depend alongside said handle, and said handle having an abutment portion disposed between the confronting faces of said tail portions for actuating said cam members in opposite directions to withdraw said plunger from locking position upon movement of said handle in either direction.

9. In an operating and locking mechanism, a support, an operating drum rotatably mounted on said support, an actuating handle mounted in substantially diametrical position on a face of said drum and having a pivotal support at one end thereof on the periphery of said drum, a locking plunger carried by said drum and reciprocable radially relative thereto, a cooperating annular keeper carried by said support having abutments engageable by said plunger in the extended position of the latter, said plunger having an inner bifurcated end having a roller journalled between the furcations thereof, a pair of cam members disposed generally parallel with and on opposite sides of said handle and having their outer ends pivoted on the periphery of said drum, said cam members having arcuate outer end portions which are concentric with said pivots and which meet in the line of reciprocation of said plunger, said arcuate portions having confronting arcuate recesses therein in which said roller is received for interlocking said cam members and said plunger, and means on said handle located between the depending portions of said cam members for rocking said cam members about their pivots to withdraw said plunger upon movement of said handle in either direction to rotate said drum.

10. In a mechanism for reciprocating a closure member between its closed and open positions including a support, an operating member rotatably mounted on said support and operatively connected with said closure member, an actuating member pivoted on said operating member for rotating the latter in opposite directions, means for normally locking said rotatable member against rotation including a radial reciprocable locking plunger carried by said operating member and a cooperating circumferential keeper carried by said support having plunger receiving apertures located at spaced points about the circumference thereof, means responsive to movement of said actuating member about its pivot in either direction for moving said plunger out of locking position including a pair of pivoted cam members having arcuate marginal portions concentric with their pivots and provided with confronting complemental recesses in their arcuate portions, and cam member interlocking means disposed in said recesses and operatively connected with said plunger for effecting movement of said cam members in unison in opposite directions, and means on said actuating member located between eccentric portions of said cam members and engageable with one or the other of said cam members for actuating the latter about their pivots to reciprocate said plunger.

11. In an operating and locking mechanism, a support, a rotatable operating member mounted on said support, a keeper surrounding said member, actuating means including a handle for rotating said operating member having a lost motion connection therewith and a pair of levers pivoted for limited movement on said operating member at opposite sides of said handle and selectively engageable thereby at points spaced from their pivots upon movement of said handle in opposite directions, a detent carried by said operating member for locking the latter to said keeper in any of a plurality of angularly related positions of the two, and means for operatively connecting said detent to said levers and for interlocking the latter whereby initial movement of said handle in either operative direction results in withdrawing said detent from locking engagement with said keeper.

12. In an operating and locking mechanism, a support, a rotatable operating member mounted on said support, a keeper surrounding said member, actuating means including a handle for rotating said operating member having a lost motion connection therewith and a pair of levers pivoted for limited movement on said operating member at opposite sides of said handle and selectively engageable thereby at points spaced from their pivots upon initial movement of said handle in opposite directions, a detent carried by said operating member for locking the latter to said keeper in any of a plurality of angularly related positions of the two, means operatively connecting said levers so that movement of either lever by said handle results in oppositely moving the other lever, and means operatively connecting said interconnected levers with said detent for operating the latter by said handle as the handle moves relative to said operating member.

EUGENE KATZBERG.